United States Patent

Hourn et al.

[11] Patent Number: 5,993,635
[45] Date of Patent: Nov. 30, 1999

[54] ATMOSPHERIC MINERAL LEACHING PROCESS

[75] Inventors: Michael Matthew Hourn, Carindale; Duncan William Turner, Albion; Ian Raymond Holzberger, Brisbane, all of Australia

[73] Assignees: M.I.M. Holdings Limited, Queensland, Australia; Highlands Frieda Pty. Limited, Port Moresby, Papua New Guinea

[21] Appl. No.: 08/913,552

[22] PCT Filed: Mar. 22, 1996

[86] PCT No.: PCT/AU96/00157

§ 371 Date: Jan. 6, 1998

§ 102(e) Date: Jan. 6, 1998

[87] PCT Pub. No.: WO96/29439

PCT Pub. Date: Sep. 26, 1996

[30] Foreign Application Priority Data

Mar. 22, 1995 [AU] Australia ................ PN1913

[51] Int. Cl.⁶ ........................................... C25C 1/20
[52] U.S. Cl. .................... 205/568; 205/580; 205/581; 205/584; 205/607
[58] Field of Search ...................... 205/589, 593

[56] References Cited

U.S. PATENT DOCUMENTS

| | | | |
|---|---|---|---|
| 3,887,474 | 6/1975 | Senfe et al. ................. | 252/8.5 B |
| 3,951,649 | 4/1976 | Kieswetter, Jr. et al. . | |
| 3,959,436 | 5/1976 | Watts . | |
| 4,004,991 | 1/1977 | Veltman et al. . | |
| 4,022,866 | 5/1977 | Kuhn et al. ................. | 423/26 |
| 4,116,488 | 9/1978 | Hsueh et al. ................ | 299/4 |
| 4,274,931 | 6/1981 | Verbaan ..................... | 204/119 |
| 4,330,379 | 5/1982 | Verbaan ..................... | 204/119 |
| 4,378,275 | 3/1983 | Adamson et al. ............ | 204/119 |
| 4,536,214 | 8/1985 | Ochs et al. .................. | 75/101 R |
| 4,571,262 | 2/1986 | Kerfoot et al. . | |
| 4,571,264 | 2/1986 | Weir et al. .................. | 75/101 R |
| 4,572,263 | 2/1986 | Weir et al. .................. | 75/101 R |
| 5,017,346 | 5/1991 | Spink et al. ................. | 423/101 |
| 5,397,380 | 3/1995 | Petersson et al. ........... | 75/743 |
| 5,589,056 | 12/1996 | Pool ............................ | 205/766 |
| 5,650,057 | 7/1997 | Jones ........................... | 205/579 |

FOREIGN PATENT DOCUMENTS

A-81941/87  6/1988  Australia .
2 108 480   5/1983  United Kingdom .

*Primary Examiner*—Donald R. Valentine
*Assistant Examiner*—Erica Smith-Hicks
*Attorney, Agent, or Firm*—Panitch Schwarze Jacobs & Nadel, P.C.

[57] ABSTRACT

A method is provided for processing a sulphide mineral composition which at least partly comprises an iron-containing mineral. The method includes the steps of: (a) milling said composition to a particle size P80 of 20 microns or less; (b) leaching said composition with a solution comprising sulphuric acid and ferric ions at ambient pressure while sparging with an oxygen-containing gas in an open tank reactor at a temperature of up to about the boiling point of the solution, whereby at least some of the acid and at least some of the ferric ions are obtained from dissolution of the iron-containing mineral, and ferrous ions generated by the leaching reaction are substantially re-oxidised to ferric ions in the leaching solution; (c) precipitating excess iron and separating said iron together with any solid materials from the leaching solution; (d) extracting desired metal ions from the leaching solution by solvent extraction with an organic solvent, such that the raffinate comprises sulphuric acid and ferric ions; (e) returning the raffinate to the leaching tank and blending with further milled composition; and (f) separating the metals from the organic phase obtained in step (c) by stripping with electrolyte and electrowinning.

29 Claims, 1 Drawing Sheet

ATMOSPHERIC MINERAL LEACHING PROCESS

FIELD OF THE INVENTION

This invention relates to a method of enabling a sulphide mineral composition to be leached at atmospheric pressure instead of above atmospheric pressure which has been hitherto required in order to achieve acceptable rates of leaching.

BACKGROUND ART

Sulphide minerals such as copper, nickel, zinc, gold and the like are recovered from their ores by a number of well known processes. One such process uses the relative solubility of the mineral in solution to allow the mineral to be leached from the ore. Conventional leaching processes require expensive equipment and a high level of technical expertise to maintain and use the equipment. Thus, it is not uncommon for an oxidative hydrometallurgy leaching plant to be located some distance away from the ore body and even in another country. This in turn significantly increases transportation costs, and it should be realised that transportation of ore or only partially enriched ore containing perhaps only a few percent of the desired mineral is extremely wasteful and undesirable, but in the absence of being able to recover the metal of value from the minerals on-site, there is little real alternative.

The processing methods of oxidative hydrometallurgy are commonly used in many different applications. Due to the refractory nature of many of the mineral species treated in such processes, these applications generally require leaching conditions of high temperature and pressure and require substantial supplies of oxygen. For example, base metals such as copper, nickel and zinc can be recovered by hydrometallurgical processes which usually embody pretreatment, oxidative pressure leaching, solid/liquid separation, solution purification, metal precipitation or solvent extraction and electrowinning.

According to conventional technology, oxidative leaching processes usually require very aggressive conditions in order to achieve acceptable rates of oxidation and/or final recoveries of metal. Under these conditions, which often mean temperatures in excess of 150° C. or alternatively temperatures in the range 150–200° C. and total pressures in excess of 1500 kPa, the chemical reactions which occur use large quantities of oxygen, both on stoichiometric considerations and in practice where amounts in excess of stoichiometric requirements are used due to process inefficiencies.

An example of oxidative hydrometallurgy is the treatment of refractory gold ores or concentrates. Refractory gold ores are those gold ores from which the gold cannot readily be leached by conventional cyanidation practice. The refractory nature of these gold ores is essentially due to very fine (sub microscopic) gold encapsulated within the sulphide minerals. This gold can often only be liberated by chemical destruction (usually oxidation) of the sulphide structure, prior to recovery of the gold, which is usually done by dissolution in cyanide solution. Of course, other lixiviates such as thiourea and halogen compounds and the like may also be used.

A number of processing options are available for treating refractory gold ores which contain sulphide minerals like pyrite, arsenopyrite and others. Pressure oxidation, typified by the so-called Sherritt process, is one such process which typically consists of the steps of feed preparation, pressure oxidation, solid/liquid separation, liquid neutralisation and gold recovery from oxidised solids usually by cyanidation.

A cryogenic oxygen plant is usually required to supply the substantial levels of oxygen demand during the pressure oxidation step, which is the heart of the Sherritt process. Typically, the conditions for the pressure oxidation step require temperatures in the region of 150° C. to 210° C., a total pressure of 2100 kPa, a pulp density equivalent to 20% to 30% solids by mass, and a retention time of two hours to three hours.

The typical oxidative hydrometallurgical processing methods referred to above generally have oxidation reactions that are carried out in multicompartment autoclaves fitted with agitators. In order to withstand the generally highly aggressive conditions of the reactions, the autoclaves are very costly, both to install and maintain. These vessels must be capable of withstanding high pressure, and linings of heat and acid resistant bricks need to be used. The agitators are made of titanium metal, and the pressure relief systems utilised are also costly and require high maintenance. These high costs and the sophistication of the technology (skilled operators are generally required) detract from the wider acceptance of high pressure/high temperature oxidation, particularly for use in remote areas or by small to medium size operators.

Cooling of the agitators also presents problems, and expensive cooling coils and heat exchange jackets are required to keep the leach temperature at optimum conditions.

The aggressive leaching conditions outlined for recovery of metal values from base metal concentrates are required to achieve acceptable leaching rates from the minerals. Under conditions of atmospheric pressure, the leaching rates of the mineral species are too low to support an economically viable leaching process.

Attempts have been made to reduce the aggressive conditions and to lower the pressures in order to lower the cost in building and operating a leaching plant. For instance, it is known to initially fine grind the ore or the ore concentrate (it being known to use flotation as an initial step to concentrate minerals in the ore), prior to oxidative hydrometallurgy to leach the ore. The fine grinding increases the surface area to volume ratio of the ore particles to improve extraction. A fine grind to an 80% passing size of 15 micron or less is used. The initial fine grind results in acceptable leaching rates being observed with less aggressive conditions, and leaching can be carried out at temperatures of 95–110° C. and at a pressure of about 10 atmospheres or about 1000 kPa.

Thus, while some progress has been made in reducing the operating parameters and thus the cost of the leach system to date, the leach still must be carried out under pressurised conditions. Pressure leach systems are expensive to build. Because of the high capital and processing costs of pressure leach systems, these systems are economical only for high grade concentrates. High grade concentrates are required because (1) operating cost per unit of contained metal considerations (2) less heat generation/exchanger problems with high grade concentrates (3) capital cost per unit of contained metal is lower balancing up with large initial capacity outlay to metal recovery.

It is also known to oxidatively leach sulphide mineral species with ferric ions. Ferric ion is a relatively effective oxidising agent which enables oxidation to be carried out at pressures less than that normally required when oxygen is the oxidant. However, there are a number of practical difficulties associated with using ferric ions as the oxidant. First, at ambient pressure the reaction is inherently slow. Also during the leaching reaction, ferric ions are reduced to ferrous ions. A build up of ferrous ions in the leaching solution adversely affects the rate of leaching. Also the ferrous ions must normally be removed from the leach liquor prior to further processing which is difficult.

Leaching solutions are generally recycled. However, before a ferric leaching solution can be recycled the ferrous ions must be re-oxidised to ferric ions. This is because it is important for maximum effectiveness of the leach that most of the iron is in the ferric form. The leach solutions can be regenerated by electrolytic oxidation, use of strong oxidisers such as permanganate, oxidation under high pressure of oxygen, or oxidation by bacteria. Each of these methods suffer from disadvantages which limit their application. For example high pressure oxidation is limited by the costs of the autoclaves involved. Oxidation by oxygen under ambient pressure can occur but only at an inherently slow rate. Catalysts may be used to increase the rate but such catalysts are expensive and are not economical for recovery from low grade ores.

Each of the above processes either require expensive autoclaves or other equipment and/or the addition of expensive reagents used for oxidation or regeneration of ferric ions. This means that it is only economically viable to process high grade ores by these methods. Another disadvantage of these processes is that they generate significant amounts of waste products such as gypsum, sulphuric acid and jarosite. These products must be disposed of in an environmentally acceptable manner which also adds to the cost.

Many valuable copper or zinc bearing ores are found in association with iron containing ores such as pyrite. Pyrite is of little value and is effectively a diluent of the valuable ores. Further, leaching of pyrite produces iron species which interfere with extraction of the desired metals. Pyrite is therefore generally removed from other ores prior to processing. The pyrite may be removed by methods such as flotation. Such separation also adds significantly to the cost and in some cases it is not economically feasible to process some low grade ores at all.

OBJECT OF THE INVENTION

It is an object of the present invention to provide a method of processing a mineral composition which can be carried out under mild conditions of temperature and pressure and which is economical when compared with existing processes.

The present inventors have surprisingly discovered that by subjecting sulphide mineral compositions to fine grinding prior to leaching under conditions in which the solution chemistry is controlled in a particular manner, such compositions can be processed under ambient conditions in open reactors without the need for the addition of expensive reagents and a separate step for regeneration of the leaching solution.

According to a first embodiment of the present invention there is provided a method of processing a sulphide mineral composition which at least partly comprises an iron containing mineral, the method comprising the steps of;

(a) milling said composition to a particle size P80 of 20 microns or less, (b) leaching said composition with a solution comprising sulphuric acid and ferric ions at ambient pressure whilst sparging with an oxygen containing gas in an open tank reactor at a temperature of up to about the boiling point of the solution, whereby at least some of the acid and at least some of the ferric ions are obtained from dissolution of the iron containing mineral, and ferrous ions generated by the leaching reaction are substantially re-oxidised to ferric ions in the leaching solution;

(c) precipitating iron and separating said iron and solid materials from the leaching solution;

(d) extracting desired metal ions from the leaching solution by solvent extraction with an organic solvent to form an organic phase and raffinate comprising sulphuric acid and ferric ions;

(e) returning the raffinate to the open tank reactor and blending with further milled composition;

(f) separating the metals from the organic phase obtained in step (d) by stripping with electrolyte from an electrowinning cell and electrowinning.

According to a second embodiment of the present invention there is provided a method of processing a sulphide mineral composition which at least partly comprises an iron containing mineral, the method comprising the steps of;

(a) milling said composition to a particle size of P80 of 20 microns or less and (b) leaching said composition with a solution comprising sulphuric acid and ferric ions at ambient pressure whilst sparging with an oxygen containing gas in an open tank reactor at a temperature of up to about the boiling point of the solution, whereby at least some of the acid and at least some of the ferric ions are obtained from dissolution of the iron containing mineral, and ferrous ions generated by the leaching reaction are substantially re-oxidised to ferric ions in the leaching solution.

According to a third embodiment of the present invention there is provided a method of processing a metal sulphide flotation concentrate comprising the steps of;

(a) milling said ore to P80 of 5 micron and (b) leaching said ore with a solution comprising sulphuric acid and ferric ions, at ambient pressure whilst sparging with an oxygen containing gas in an open tank reactor at a temperature of up to about the boiling point of the solution.

The method of the present invention is applicable to any type of sulphide mineral composition. Such compositions include ores and concentrates. The method of the present invention is especially suitable for processing concentrates. Examples of suitable materials include chalcopyrite, bornite, enargite, pyrite, covellite, sphalerite, chalcocite, pentlandite, cobaltite, pyrrhotite or mixtures of any two or more thereof. Metals which can be extracted from the mineral compositions according to the method of the first embodiment include copper, zinc, nickel and cobalt. The concentrate grade may range from very low such as for example with copper containing materials 7–8 wt % copper to high grade concentrates having about 26 wt % copper.

The iron containing mineral can be any mineral which under the leaching conditions will produce ferrous or ferric ions upon dissolution. Especially preferred is pyrite, $FeS_2$, or pyrite ore which produces ferric ion and some sulphuric acid according to the following:

$$FeS_2 + 2O_2 \dashrightarrow FeSO_4 + S°$$

$$2FeS_2 + 7/2O_2 \dashrightarrow 2FeSO_4 + 2H_2SO_4$$

-continued

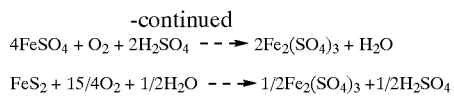

Preferably sufficient iron containing mineral is present such that it provides substantially all of the ferric ions in the leaching solution. The relative amounts of iron containing mineral will of course depend on the types and amounts of the other components in the ore. Typically about 20 to about 60 wt % pyrite is present. If desired, additional pyrite or other minerals may also be added. Alternatively additional ferric sulphate may be added. It can be seen that the iron containing minerals may also provide a source of sulphuric acid. Additional acid may need to be provided if required. Sulphuric acid is typically generated in associated processes such as electrowinning and solvent extraction. Preferably sulphuric acid produced in this way is recycled to the leaching step.

A preferred type of apparatus which may be suitable for producing fine or ultra fine sulphide mineral compositions in finely divided form is a stirred mill. However, it will be appreciated that other types of comminution apparatus may also be used such as wet and dry vibratory mills or planetary mills to provide the fine or ultra fine milling of the invention.

In a preferred form, vertical or horizontal stirred mills generally consist of a tank filled with small diameter grinding media (for example 1–6 mm diameter steel or ceramic balls) which are agitated by means of a vertical or horizontal shaft usually fitted with perpendicular arms or discs. The sulphide minerals (usually contained in the form of a concentrate) are milled by the sheering action produced by ball to ball contact, or between balls and the stirrer or balls and the walls of the tank. The milling may be carried out dry or wet. These vertical or horizontal stirred mills have been found to be satisfactory in providing the required degree of fineness, and in satisfying energy and grinding media consumption requirements. Furthermore, the activity of the ground product as measured by its response to subsequent oxidation, has also been found to be satisfactory. In this respect the ore is ground to a maximum average particle size of 80% passing size of 20 microns as measured with a laser sizer. In the present specification and claims the term P80 is used to describe the size at which 80% of the mass of the material will pass. Preferably the particle size is less than P80 of 5 micron. The desired particle size may vary with the type of mineral species used. Especially preferred paricle sizes for different concentrates, expressed as P80, are chalcopyrite/bornite—4.5 micron; enargite—3 micron; pyrite—3 micron; covellite—20 micron; chalcocite—20 micron; pentlandite—5 micron and cobaltite—5 micron.

The mild conditions of pressure and temperature in the oxidative leach that follows the milling, are low when compared with the relatively high pressure and temperature conditions of known pressure oxidation techniques such as the Sherritt process or Activox process. As indicated above, the Sherritt process typically requires temperatures in the order of 150 to 210° C. and total pressures in the order of 2100 kPa. The Activox process is designed to operate at pressures between 9 and 10 atmospheres and temperatures within the range 90–110° C. However, the accleration of the leaching response of the mineral species in accordance with the present invention allows the oxidative leach to be conducted at temperatures below about 100° C. and at atmospheric pressure in cheap open tank reactors.

With the preferred operating conditions being at about 60° C. up to the boiling point of the solution and at 1 atm total pressure, a low cost reactor such as an open tank is sufficient to serve as the leaching vessel. There also is no need for the use of expensive titanium metal agitators due to the less corrosive nature of the leach solution. Furthermore, abrasion problems are substantially reduced due primarily to the fine nature of the feed.

Importantly, the complex heat exchange and pressure let down systems necessary for operation of a pressure vessel are not necessary as the reactor operates at atmospheric pressure. Excess heat is removed from the system through solution evaporation and this removes the need for costly heat exchange facilities. Also the reaction becomes autogenous at above about 60 to about 70° C. If additional heating is required this can be easily done by known methods such as the injection of steam.

Further, much higher percent solids slurries can be treated by the described method due to the relaxation of the requirements for low sulphur levels in feed to an autoclave necessary for heat control purposes. Typically the leach slurry density varies from about 10 to about 20 wt %.

In the method of the first embodiment the leaching solution is typically recycled raffinate from the solvent extraction step. In this case preferably most of the ferric ion and sulphuric acid may be generated by the leach/solvent extraction/electrowinning process. If the leach is not part of a continuous process, ferric and sulphuric acid may be added if required. Typically the raffinate comprises 30–40 g/l $H_2SO_4$ and 10–20 g/l Fe. The Fe will normally be present as a mixture of ferric and ferrous ions.

The leaching solution is sparged with an oxygen containing gas. The gas may be air or preferably oxygen or oxygen enriched air. The gas flow is dependent upon the amount of oxygen required to sustain the leaching reaction and regeneration of the ferric ions. Typically the gas flow is about 400 to about 1000 kg $O_2$ per ton of metal produced. If desired a surfactant or the like may be added to minimize frothing of the leaching solution. Under the conditions of the leaching reaction, the metals may be oxidised by ferric ion according to the following general reaction:

$$MS + 2Fe^{3+} \rightarrow M^{2+} + 2Fe^{2+} + S°$$

Further oxidation of the elemental sulphur to sulphate according to the reaction:

$$S° + 3/2O_2 + H_2O \rightarrow H_2SO_4$$

requires elevated temperature and pressure and does not occur to any significant extent under the leaching conditions of the present invention. For example, at 90° C. at atmospheric pressure, in the absence of bacterial catalysis, less than 5% of the elemental sulphur is oxidised to sulphate. By comparison, at 180° C. and 12 atmospheres oxygen partial pressure, most of the sulphur is oxidised to sulphate. Oxidation to sulphate has several disadvantages as additional neutralising reagents are required during the postleaching neutralisation steps. A further advantage of formation of elemental sulphur is that gaseous emission such as sulphur dioxide is minimized which causes an environmental hazard. Further by not carrying out the oxidation completely to sulphate, the consumption of oxygen is significantly reduced which saves on operating costs. For example conventional PSA oxygen plants may be sufficient to supply the oxygen without the need for cryogenic oxygen plants. This in turn reduces the capital cost and the operating costs by using equipment that is simple to operate.

The ferric ions are regenerated by reaction of the ferrous ions with oxygen according to:

$$4Fe^{2+} + 4H^+ + O_2 \rightarrow 4Fe^{3+} + 2H_2O$$

Typically oxidation of the ferrous ion occurs at a rate of 2–5 g of ferrous ion oxidised per litre of slurry per hour of reaction.

After substantially all the mineral has been oxidised the leach slurry may be further processed according to known methods. Preferably the slurry is filtered to remove solids and the clear liquid subjected to solvent extraction followed by electrowinning. Typically the leach slurry is neutralised prior to any further processing. As described above the production of sulphate is reduced under the conditions of the present invention, thereby minimising the amount of neutralising agents which need to be added. Typically the slurry is neutralised by the addition of limestone or the like. This also precipitates excess iron, arsenic and other impurities generated in the leach. Tests carried out under the conditions of the present invention have also indicated that iron can be selectively precipitated and remains in the leach residue as goethite, jarosite or some form of hydrated oxide, whilst valuable minerals like nickel, copper or zinc remain in solution. If desired the precipitated solids may be further filtered and any remaining liquid may be returned to the leach solution for further processing. As described above substantially all of the sulphide sulphur is oxidised to elemental sulphur during the leaching reaction. The elemental sulphur is present as finely dispersed granules. Because the leach is conducted at temperatures below the melting point of sulphur ie 120° C., agglomeration of molten sulphur is avoided. The granulated sulphur is normally removed from the leaching solution with the goethite and/or other iron residue.

The solids which are separated from the leaching solution may be further treated to extract any precious metals such as gold, platinum or silver. These methods of extraction such as cyanidation for gold are well known in the art.

The steps of solvent extraction and electrowinning are well known in the art and need not be described in detail. Typically the neutralised slurry may filtered and extracted with an organic solvent which recovers metals such as copper, nickel or zinc. The metals may then be stripped from the organic phase by known methods. The metals are then separated from the electrolyte by electrowinning. The spent electrolyte may then be returned to the stripping stage.

BEST MODE

Figure 1:
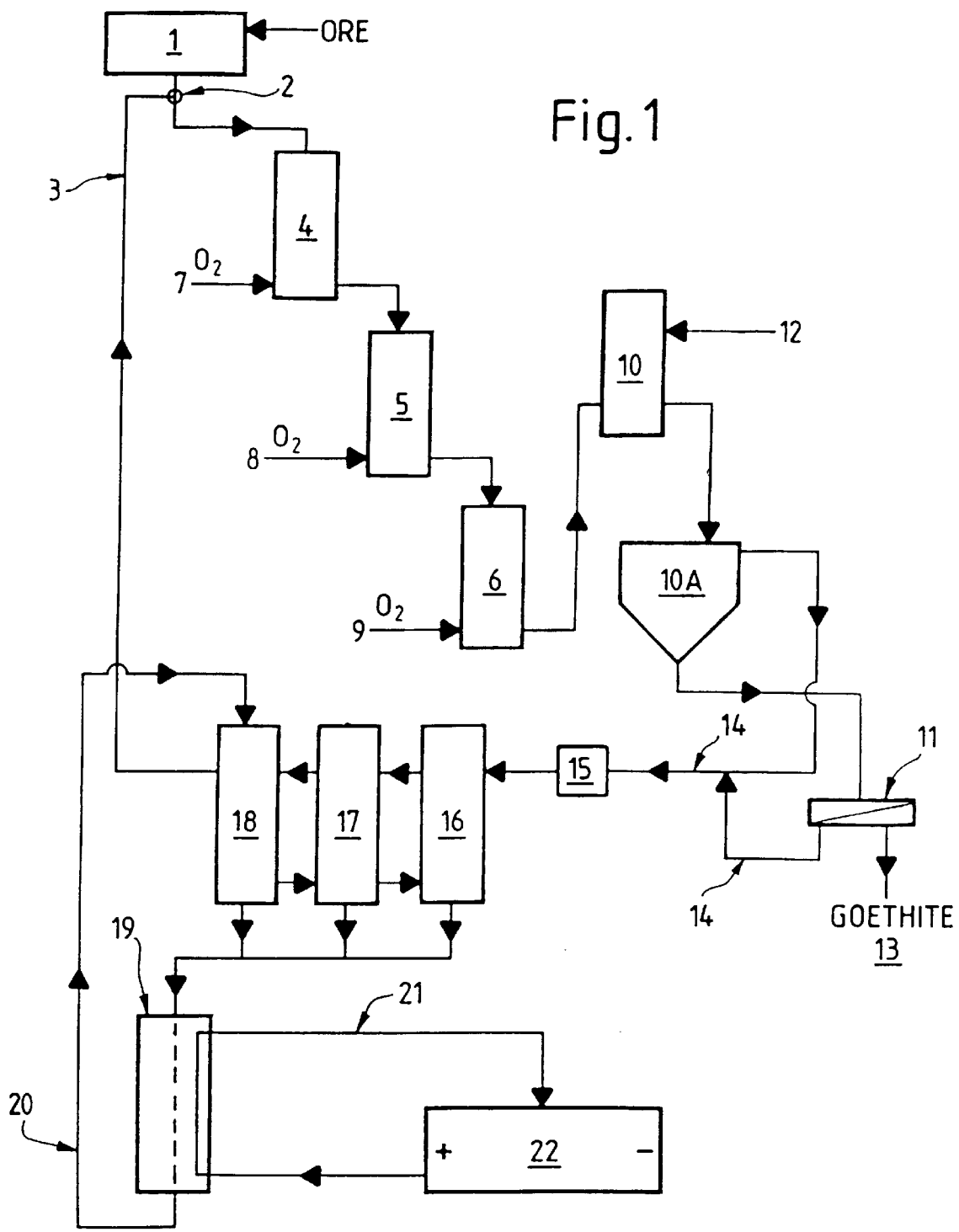
FIG. 1 is a flow diagram of the method according to a preferred embodiment of the invention.

The present invention will now be described in relation to the following examples. However, it will be appreciated that the generality of the invention as described above is not to be limited by the following description.

EXAMPLE ONE

Enargite and Chalcocite Leaching

Copper flotation concentrate containing 19.5% copper, 4.0% arsenic, 23% iron, 2.35 g/t gold and 36% sulfide sulfur was milled to a size of 80% passing 5 micron in a horizontal 1 litre stirred ball mill. Mineralogically the concentrate was composed of 11.9% chalcocite ($Cu_2S$), 20.9% enargite ($Cu_3AsS_4$), 50% pyrite ($FeS_2$) and the remainder was siliceous gangue minerals.

The milled pulp was leached at 90° C. in an open reactor utilising a ferric ion sulfuric acid lixiviant solution with either oxygen or air sparging. The solids were recovered by filtration and reslurry washed with 5% v/v sulfuric acid solution, prior to being dried and assayed. Post leach solutions were analysed for copper, arsenic and iron by conventional atomic absorption spectroscopy analytical methods. Ferrous and ferric levels were determined by potassium permanganate titrations, whilst the acid levels were determined by a neutralisation method.

Greater than 92% copper dissolution was achieved from concentrate milled to a particle size of $P_{80}$ 3.5 microns in 10 hours employing leach conditions of 10% pulp density, 30 g/L ferric ions, 50 g/L sulfuric acid, 90° C., oxygen sparging and 2.0 kg/ton lignosol. Lignosol was used to reduce the amount of frothing in the initial stages of the leach.

The leach residue was then leached in aerated sodium cyanide solution to recover gold. The leach test was conducted at ambient temperature with 300 ppm free NaCN maintained in the leach solution during the leach. The test was fun for 24 hours at a pulp density of 45% solids. Greater than 82% gold extraction was achieved from the residue.

The predominate leaching mechanism thought to be occurring in the above system involves ferric ions acting as the oxidant, although it is conceivable that an acid/oxygen mechanism is also operating. The predominate reactions occurring in this leaching system are presented below.

$$Cu_2S + H_2SO_4 + 5/2O_2 \longrightarrow 2CuSO_4 + H_2O$$

$$Cu_2S + 2Fe_2(SO_4)_3 \longrightarrow 2CuSO_4 + 4FeSO_4 + S°$$

$$2Cu_3AsS_4 + 11Fe_2(SO_4)_3 + 8H_2O \longrightarrow$$
$$6CuSO_4 + 2H_3AsO_4 + 5H_2SO_4 + 8S° + 22FeSO_4$$

$$FeS_2 + 2O_2 \longrightarrow FeSO_4 + S°$$

$$FeS_2 + 15/4O_2 + 1/2H_2O \longrightarrow 1/2Fe_2(SO_4)_3 + 1/2H_2SO_4$$

Ferric iron was regenerated in the leach solution by the action of oxygen on ferrous iron according to the reaction:

$$2FeSO_4 + H_2SO_4 + 1/2O_2 \rightarrow Fe_2(SO)_3 + H_2O$$

In this way, the ferric oxidant was continually regenerated during the leaching process.

The pulp density in the reactor appeared to be limited by the solubility of copper sulfate in the resulting iron/acid electrolyte. The use of air instead of oxygen increased the leaching residence time from 10 hours (oxygen) to 14 hours (air) without loss of overall copper recovery.

EXAMPLE TWO

Chalcocite Leaching

Copper flotation concentrate containing 8.1% copper, 0.2% arsenic, 13.8% iron and 18% sulfide sulfur was milled to a size of 80% passing 5 micron in a horizontal 1 litre stirred ball mill. This concentrate contained 9.4% chalcocite ($Cu_2S$), 1.3% enargite ($Cu_3AsS_4$), 29.6% pyrite ($FeS_2$) and the remainder was siliceous gangue.

The milled pulp was leached at 90° C. in an open reactor utilising a ferric ion sulfuric acid lixiviant solution with either oxygen or air sparging. Greater than 95% copper dissolution was achieved in 10 hours employing leach conditions of 10% pulp density, 30 g/L ferric ions, 50 g/L sulfuric acid, 90° C., oxygen sparging and 2.0 kg/ton lignosol.

EXAMPLE THREE

Chalcopyrite Leaching

Copper flotation concentrate containing 18.0% copper, 25.5% iron and 18.6% sulfide sulfur was milled to a size of 80% passing 5 micron in a horizontal 1 litre stirred ball mill. This concentrate contained 51.8% chalcopyrite ($CuFeS_2$), 20.8% pyrite ($FeS_2$) and the remainder was siliceous gangue.

The milled pulp was leached at 80° C. in an open reactor utilising a ferric ion sulfuric acid lixiviant solution with oxygen sparging. Greater than 95% copper dissolution was achieved in 10 hours employing leach conditions of 10% pulp density, 5 g/L ferric ions, 20 g/l ferrous iron, 50 g/L sulfuric acid, 90° C., oxygen sparging and 2.0 kg/ton lignosol.

The method of the invention can be used in association with other upstream or downstream processes. For instance, prior to the fine grind and leach, the ore can be treated in one or more flotation steps. Downstream processes can include flotation processes with or without additional fine grinding, and/or can include solvent extraction and electrowinning steps.

EXAMPLE FOUR

Nickel Leaching

Nickel bearing concentrate containing 1.7% nickel, 0.03% cobalt, 11% iron and 16% sulfide sulfur was milled to a size of 80% passing 5 micron in a horizontal 1 litre stirred ball mill. Mineralogically the concentrate was composed of pentlandite, pyrite and the remainder was siliceous gangue materials.

The milled pulp was leached at 90° C. in an pen reactor utilising a ferric ion sulfuric acid lixiviant solution with oxygen sparging. The solids were recovered by filtration and reslurry washed with water, prior to being dried and assayed. Post leach solutions were analysed for nickel, cobalt and iron by conventional atomic absorption spectroscopy analytical methods. Ferrous and ferric levels were determined by potassium permanganate titrations, whilst the acid levels were determined by a neutralisation method.

Greater than 92% nickel and 86% cobalt dissolution was achieved from concentrate milled to a particle size P80 of 5 microns in a leach time of 8 hours employing leach conditions of 10% pulp density, 5 g/L ferric ions, 20 g/l ferrous iron, 80 g/L sulfuric acid, 90° C., oxygen sparging and 2.0 kg/ton lignosol. Lignosol was used to reduce the amount of frothing in the initial stages of the leach.

EXAMPLE FIVE

Cobalt Leaching

Cobalt bearing concentrate containing 0.309% cobalt, 8.5% iron and 0.66% arsenic was milled to a size of 80% passing 3 microns in a horizontal 1 litre stirred ball mill. Mineralogically the concentrate was composed of cobaltite and cobaltiferous pyrite, pyrite and the remainder was siliceous gangue minerals.

The milled pump was leached at 90° C. in an open reactor utilising a ferric ion sulfuric acid lixiviant solution with oxygen sparing. The solids were recovered by filtration and reslurry washed with water, prior to being dried and assayed. Post leach solutions were analysed for cobalt and iron by conventional atomic absorption spectroscopy analytical methods. Ferrous and ferric levels were determined by potassium permanganate titrations, whilst the acid levels were determined by a neutralisation method.

Greater than 79% cobalt dissolution was achieved from concentrate milled to a particle size of P80 of 3 microns in a leach time of 8 hours employing leach conditions of 10% pulp density, 10 g/L ferric ions, 50 g/L sulfuric acid, 90° C., oxygen sparging and 2.0 kg/ton lignosol.

EXAMPLE SIX

Zinc Leaching

Zinc concentrate containing 46.6% zinc, 10% iron and 2.8% lead was milled to a size of 80% passing 3 micron in a horizontal 1 litre stirred ball mill. Mineralogically the concentrate was composed of sphalerite, galena, pyrite and the remainder was siliceous gangue minerals.

The milled pulp was leached at 90° C. in an open reactor utilising a ferric ion sulfuric acid lixiviant solution with oxygen sparging. The solids were recovered by filtration and reslurry washed with water, prior to being dried and assayed. Post leach solutions were analysed for zinc and iron by conventional atomic absorption spectroscopy analytical methods. Ferrous and ferric levels were determined by potassium permanganate titrations, whilst the acid levels were determined by a neutralisation method.

Greater than 97% zinc extraction was achieved from zinc concentrate milled to a particle size of P80 of 3 microns in a leach time of 8 hours employing leach conditions of 10% pulp density, 10 g/L ferric ions, 50 g/L sulfuric acid, 90° C., oxygen sparging and 2.0 kg/ton lignosol.

EXAMPLE SEVEN

Chalcopyrite Leaching as a Continuous Process

The example below describes the operation of a fully continuous pilot plant designed to produce 8 kg per day of LME grade A cathode copper from a copper concentrate. The pilot plant ran for 21 days treating the feed outlined below.

Referring to FIG. 1 a concentrate sample of the composition listed below was slurried in tap water at a slurry density of 60% w/w. The slurry was then milled in step 1 to a particle size of 80% passing 10 microns in a horizontal stirred bead mill.

Table 1 Composition of the concentrate sample:

| | |
|---|---|
| $CuFeS_2$ | 37% w/w |
| $FeS_2$ | 44% w/w |
| $SiO_2$ | 11% W/W |
| Other | 8% W/W |

The slurry sample was then mixed in step 2 with solvent extraction plant raffinate 3 to dilute the slurry density of 15% w/w. The raffinate contained 35 g/l $H_2SO_4$, 9 g/l ferric iron and 10 g/l ferrous iron.

The diluted slurry was then pumped through a three vessel leaching train 4,5,6 at a flow rate designed to give a residence time in the leaching train of 20 hours. The leaching train consisted of three agitated 100 litre baffled tanks. Slurry flowed by gravity from one tank to the next. The tanks were maintained at 90° C. by a combination of the exothermic nature of the leach reaction and the injection of live steam into the slurry. Oxygen was injected into the slurry by air spear 7,8,9 located below the leach agitator. The oxygen was added at a rate of 600 kg per ton of copper produced. The copper extraction across the leaching circuit was 97% w/w.

No acid or iron sulphate was added to the leaching circuit for the duration of the 21 day pilot plant run.

Leached slurry overflowed the final leach tank into a neutralisation tank 10 and then to a thickener 10A. The leach solution composition was typically 17–19 g/l copper and 35–45 g/l iron. The slurry was neutralised to pH 2.0 with limestone slurry 12 to precipitate iron from the leach slurry as goethite 13. Finely granulated elemental sulphur was removed with the goethite. The slurry comprising the goethite, sulphur and leach residue was filtered 11 and any liquid was returned to the leach solution 14.

Neutralised slurry was then pumped through a plate and frame pressure filter 15. The filtrate contained 17–19 g/l copper, 20 g/l iron and 5 g/l $H_2SO_4$. The filtrate was then pumped through a three stage solvent extraction plant 16,17, 18 to recover copper from the leach liquor. The raffinate from the solvent extraction stage contained 0.3 g/l copper, 20 g/l iron and 35 g/l $H_2SO_4$ and 20 g/l iron, and was transferred back to the leaching circuit and blended with more ground concentrate at 2.

Loaded organic from the solvent extraction plant was then stripped 19 with spent electrolyte containing 180 g/l $H_2SO_4$. The stripped organic 20 was pumped back to the extraction stage.

The rich electrolyte 21 was then pumped through a 200 litre electrowinning cell 22 containing two cathodes and three anodes. Each cathode face had an area of 0.25 $m^2$. Copper was plated out from the rich electrolyte at a current density of 280 $A/m^2$ to produce a cathode plate. The spent electrolyte from the cell contained 180 g/l $H_2SO_4$ and 32 g/l copper. The copper cathode was analysed and met the requirements for LME Grade A.

The goethite leach residue was leached in sodium cyanide to determine the amount of gold which could be recovered from the oxidised concentrate. The leach residue was leached at 45% w/w solids at pH 10, with a free cyanide level of 300 ppm maintained throughout the leach. The slurry was leached for 24 hours in a batch test. Gold recovery from the leach residue was 92.5% w/w.

It can be seen that the methods of the present invention offer a number of advantages over existing methods. The need for tight control on concentrate grade is relaxed due to the lower operating costs of the leach relative to a pressurized leach, and the control of excess heat generation through evaporative cooling of the open tank reactors.

The leach can be conducted in cheap open tanks instead of expensive pressure vessels. An equivalent sized pressure leach facility may cost about 6 to 8 times as much as the open tank leaching system of the present invention. This also enables a leaching circuit to be constructed practically on site. This avoids costs of transportation which can be considerable. In some cases these costs may make it uneconomical to transport and process low grade ores.

The leach circuit is less sensitive to grade of metal. Therefore this will enable higher metal recovery in upstream unit operations.

The method of the present invention is also capable of producing a high grade electrowin metal. For example in some cases it may be possible to produce a product through solvent extraction/electrowinning which can be sold directly. Smelted metal generally requires further refining. This enables substantial cost savings as well as producing a product which will attract a premium price.

The leach reaction is self-sustaining when coupled with a solvent extraction-electrowinning plant, as the only reagents that need to be added to the leach are air/oxygen and a neutralising agent such as lime. The need for addition of expensive reagents is eliminated.

The present invention is ideal for mineralogically complex ores which are finely disseminated base metal sulphides minerals with other sulfide (e.g. chalcocite, sphalerite, enargite covering pyrite ores) that have been traditionally difficult to treat metallurgically.

It should be appreciated that various other changes and modifications may be made to the embodiments described without departing from the spirit and scope of the invention.

We claim:

1. A method of processing a sulphide mineral composition which at least partly comprises an iron containing mineral, the method comprising the steps of;

(a) milling said composition to a particle size P80 of 20 microns or less,
   (b) leaching said composition with a solution comprising sulphuric acid and ferric ions at ambient pressure whilst sparging with an oxygen containing gas in an open tank reactor at a temperature of up to about the boiling point of the solution, wherein at least some of the acid and at least some of the ferric ions are obtained from dissolution of the iron containing mineral, and ferrous ions generated by the leaching reaction are substantially re-oxidised to ferric ions in the leaching solution;
   (c) precipitating iron and separating said iron and solid materials from the leaching solution;
   (d) extracting desired metal ions from the leaching solution by solvent extraction with an organic solvent to form an organic phase and raffinate comprising sulphuric acid and ferric ions;
   (e) returning the raffinate to the open leaching tank reactor and blending with further milled composition;
   (f) separating the metals from the organic phase obtained in step (d) by stripping with electrolyte from an electrowinning cell and electrowinning.

2. The method of claim 1, wherein said composition is a flotation concentrate.

3. The method of claim 2, wherein said concentrate is a low grade concentrate.

4. The method of claim 1, wherein said iron containing mineral is a pyrite ore.

5. The method of claim 4, wherein said mineral composition comprises 20 to 60 wt % pyrite.

6. The method of claim 5, wherein substantially all of said ferric ions are generated by dissolution of pyrite.

7. The method of claim 1, wherein said composition is milled to a particle size of P80 of 10 micron or less.

8. The method of claim 1, wherein said temperature is from about 60° C. up to about the boiling point of the leaching solution.

9. The method of claim 1, wherein said gas is oxygen.

10. The method of claim 9, wherein oxygen is sparged at a rate of 400 to 1000 kg per ton of metal produced.

11. The method of claim 1, wherein the solid from step (c) is further leached to recover any precious metals.

12. The method of claim 11, wherein said precious metals are selected from the group consisting of gold, platinum or silver.

13. The method of claim 1, wherein said metal is selected from the group consisting of copper, zinc, nickel or cobalt.

14. A method of processing a sulphide mineral composition comprising about 30 to about 40 wt % chalcopyrite, about 40 to about 50 wt % pyrite and up to 20 wt % siliceous gangue, the method comprising (a) milling the composition to a particle size P80 of 10 microns, (b) leaching said composition with a solution comprising sulphuric acid and ferric ions at ambient pressure whilst sparging with oxygen at a rate of about 600 kg per ton of copper produced in an open reactor at a temperature of about 90° C., (c) neutralizing the leaching solution with limestone to precipitate excess iron as goethite and removing the goethite and any other solids from the leaching solution;

(d) filtering the leaching solution and extracting dissolved copper from the leaching solution by solvent extraction with an organic solvent, such that the raffinate comprises sulphuric acid and ferric ions;

(e) returning the raffinate to the leaching tank and blending with further milled composition;

(f) separating the copper from the organic phase obtained in step (c) by stripping with electrolyte from an electrowinning cell and electrowinning.

15. A method of processing a sulphide mineral composition which at least partly comprises an iron containing mineral, the method comprising the steps of;

(a) milling said composition to a particle size P80 of 20 microns or less and (b) leaching said composition with a solution comprising sulphuric acid and ferric ions at ambient pressure whilst sparging with an oxygen containing gas in an open tank reactor at a temperature of up to about the boiling point of the solution, whereby at least some of the acid and at least some of the ferric ions are obtained from dissolution of pyrite, and ferrous ions generated by the leaching reaction are substantially re-oxidised to ferric ions in the leaching solution.

16. The method of claim 15 wherein said composition is a flotation concentrate.

17. The method of claim 15 wherein said iron containing mineral is a pyrite ore.

18. The method of claim 17 wherein said composition comprises 20 to 60 wt % pyrite.

19. The method of claim 18 wherein substantially all of said ferric ions are generated by dissolution of pyrite.

20. The method of claim 15 wherein said composition is milled to a particle size P80 of 5 micron.

21. The method of claim 15 wherein said temperature is about 60° C. up to the boiling point of the leaching solution.

22. The method of claim 15 wherein said gas is oxygen.

23. The method of claim 22 wherein oxygen is sparged at a rate of about 400 to about 1000 kg per ton of metal produced.

24. The method of claim 15 wherein a surfactant is added in step (a) to minimize frothing of the solution.

25. A method of processing a metal sulphide flotation concentrate comprising the steps of;

(a) milling said ore to P80 of 5 micron and (b) leaching said concentrate with a solution comprising sulphuric acid and ferric ions, at ambient pressure whilst sparging with an oxygen containing gas in an open tank reactor at a temperature of up to about the boiling point of the solution.

26. The method of claim 25 wherein said temperature is about 60° C. up to the boiling point of the leaching solution.

27. The method of claim 26 wherein said gas is oxygen.

28. The method of claim 27 wherein oxygen is sparged at a rate of about 400 to about 1000 kg per ton of metal produced.

29. The method of claim 28 wherein a surfactant is added in step (a) to minimise frothing of the solution.

* * * * *